US007996953B2

(12) United States Patent
Braun et al.

(10) Patent No.: US 7,996,953 B2

(45) **Date of Patent: *Aug. 16, 2011**

(54) WIPER BLADE

(75) Inventors: Hans Braun, Tienen (BE); Dirk Herinckx, Drieslinter (BE); Inigo Op't Roodt, Hasselt (BE); Hans Beelen, Herk de Stad (BE); David Van Baelen, Herent (BE); Peter Saevels, Attenrode (BE)

(73) Assignee: Robert Bosch Gmbh, Stuttgart (DE)

( * ) Notice: Subject to any disclaimer, the term of this patent is extended or adjusted under 35 U.S.C. 154(b) by 1222 days.

This patent is subject to a terminal disclaimer.

(21) Appl. No.: 11/597,723

(22) PCT Filed: Apr. 14, 2005

(86) PCT No.: PCT/EP2005/051646

§ 371 (c)(1), (2), (4) Date: Nov. 27, 2006

(87) PCT Pub. No.: WO2005/115813

PCT Pub. Date: Dec. 8, 2005

(65) Prior Publication Data

US 2008/0016643 A1 Jan. 24, 2008

(30) Foreign Application Priority Data

May 28, 2004 (DE) ......................... 10 2004 026 687
Oct. 22, 2004 (DE) ......................... 10 2004 051 467

(51) Int. Cl.
*B60S 1/38* (2006.01)

(52) U.S. Cl. ............................... 15/250.43; 15/250.452

(58) Field of Classification Search ............... 15/250.43, 15/250.44, 250.451, 250.452, 250.453, 250.454, 15/250.361

See application file for complete search history.

(56) References Cited

U.S. PATENT DOCUMENTS

| | | | | |
|---|---|---|---|---|
| 2,782,443 | A * | 2/1957 | Krohm | 15/250.452 |
| 3,574,881 | A * | 4/1971 | Temple | 15/250.04 |
| 4,683,606 | A * | 8/1987 | Sharp | 15/250.451 |
| 7,581,280 | B2 * | 9/2009 | Op't Roodt et al. | 15/250.43 |
| 2007/0289082 | A1 | 12/2007 | Herinckx et al. | |
| 2009/0172910 | A1 * | 7/2009 | De Block et al. | 15/250.361 |
| 2010/0071148 | A1 * | 3/2010 | Wilms et al. | 15/250.43 |

FOREIGN PATENT DOCUMENTS

| | | |
|---|---|---|
| DE | 100 25 710 | 8/2001 |
| DE | 101 13 680 | 2/2002 |
| DE | 101 39 104 | 3/2003 |
| DE | 102 45 693 | 4/2004 |
| JP | 1024806 A | 1/1998 |

* cited by examiner

*Primary Examiner* — Gary K Graham

(74) *Attorney, Agent, or Firm* — Michael Best & Friedrich LLP

(57) ABSTRACT

A wiper blade (10) comprising a rubber elastic wiper strip (12) in which a resilient rail (18, 20) is inserted into a lateral longitudinal groove on each side of side of said wiper blade as a support element and laterally protrudes from the longitudinal groove, wherein the resilient rails (18, 20) support terminal caps (26, 60, 81) while being held together at their ends and being fixed relative to the wiper strip (12) in the longitudinal direction by a bridge (22), which is joined in a fixed manner to the resilient rails (18, 20) at the lateral parts of said bridge and forms a free space for a top strip (16) of the wiper strip (12) in the central area of the bridge. It is proposed that the terminal caps (26, 60, 81) have detachable fixing means (52) that engage in the top strip (16) of the wiper strip (12), wherein the axial movability of the resilient rails (18, 20) relative to the wiper strip (12) is limited by the terminal caps (26, 60, 81).

21 Claims, 6 Drawing Sheets

30 38 48 44 50 12 14 44 28 24

58 46 52 42 50 46 54 42

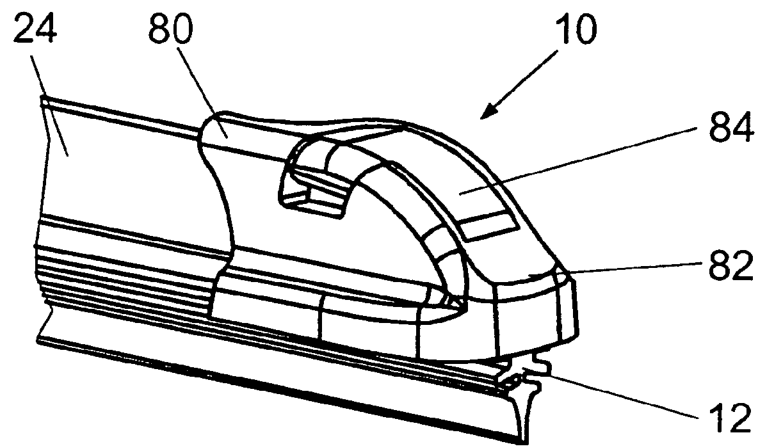
Fig. 11
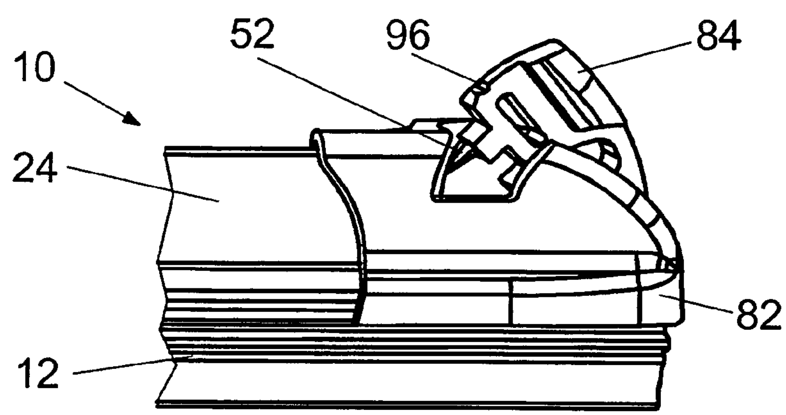
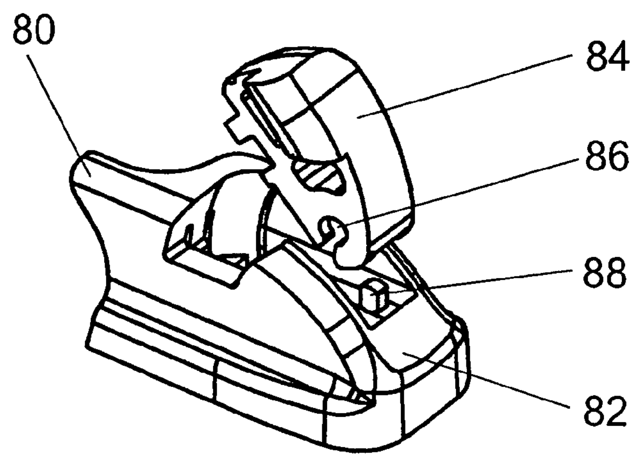
Fig. 12
Fig. 13

WIPER BLADE

BACKGROUND OF THE INVENTION

The invention starts with a wiper blade. A non-articulated wiper blade is known from DE 101 13 680 A1 whose wiper strip is comprised of an elastomer material and has a spoiler situated on its upper side. This spoiler can be formed on directly and be comprised of the same material as the wiper strip or be a separate component made of another suitable plastic. The spoiler can serve as a support element of the wiper blade by itself or together with resilient rails, which are inserted into lateral longitudinal grooves of the profile of the wiper strip. Mounted on the ends of the wiper blade are caps, whose guide surfaces run in the longitudinal direction of the wiper blade and are adjacent with a slight shoulder to the guide surface of the spoiler. Because of the guide surfaces of the spoiler and the terminal caps, the air stream increasingly presses the wiper blade against the vehicle window with increasing vehicle speed if the air stream is flowing towards the wiper blade essentially transverse to the longitudinal direction. In the center region of the wiper blade in a section of the spoiler, a connecting device is fastened to the support element according to the so-called sidelock system, in which the wiper arm runs laterally parallel to the wiper blade in the region of the connecting device. It is also known as a so-called overlock system, in which the wiper arm runs above the wiper blade in the region of the connecting device. The connecting device has two claws on each of its side parts, which laterally clasp and hold the resilient rails of the support element.

A so-called non-articulated wiper blade that has a rubber elastic wiper strip with a wiper lip is known from DE 100 25 710 A1. Provided between the wiper lip and a top strip are lateral longitudinal grooves, into which the resilient rails are inserted as a support element. These resilient rails are held together at their ends by bridge elements and a center connecting element. The bridge elements have a formed-on extension as a fixing means that has on its free end a projection that is directed towards the top strip. During assembly the extension is bent against the top strip so that the projection engages in the top strip and the resilient rails are fixed relative to the wiper strip in the longitudinal direction. Finally, the bridge elements are covered with terminal caps.

SUMMARY OF THE INVENTION

According to the invention, the terminal caps of the wiper blade have detachable fixing means that engage in a top strip of the wiper strip, wherein the axial movability of the resilient rails relative to the wiper strip is limited by the terminal caps. The resilient rails are not directly fixed on the wiper strip, but indirectly via the terminal cap.

After the terminal caps have been removed during disassembly, the wiper strip can be replaced in a simple manner even by a layperson. If the fixing means should be damaged inadvertently in the process, the inexpensive terminal cap can be replaced. The expensive resilient rails can always be reused.

In one embodiment of the invention, the terminal cap is comprised essentially of a base part and a swivelable cover. For assembly, the base part is first connected with an opened cover on the end of the wiper strip until formed-on locking noses lock on the side of a bridge holding the two lateral resilient rails together, which side faces away from the end of the wiper strip. In this position the base part is fixed on the end and in the longitudinal direction of the resilient rails. In a second assembly step, the cover is then swiveled into its closed position in which it completely closes an opening of the base part, thereby lending the terminal cap an aerodynamically favorable shape and completely covering the end of the wiper blade.

The cover has a cam on its inner side, which presses during the closing motion on a flexible tongue, which is arranged parallel to a top strip of the wiper strip in the area of the opening of the base part. The cams are embodied such that they exceed a maximum during the closing motion so that the cover cannot open automatically. Because of the cam shape, the actuation force can be transmitted in relation to the pressure force.

The flexible tongue has a formed-on locking mandrel on the side facing away from the top strip and this locking mandrel is pressed into the top strip in the closed position. In the cover's closed position, the resilient rails can then be fixed in the longitudinal direction relative to the wiper strip via the sharp locking mandrel that engages in the rubber elastic surface of the top strip so that the resilient rails are henceforth fixed relative to the wiper strip via the terminal cap. In addition, in the closed position, the locking noses locked on the ridge are locked via cheeks on the inner side of the cover so that the terminal cap cannot detach unintentionally from the wiper blade end.

The terminal caps are very simple to disassemble. To do so, the cover is merely swiveled from the closed position, and namely far enough for the flexible tongue to lift up and the locking mandrel to disengage. At the same time, the lock of the locking noses is detached in this position so that the base part of the terminal cap can be slid from the wiper blade end. In this state, a worn wiper strip can be removed and replaced by a new one. The fact that only the wiper strip needs to be replaced to restore wiper quality and the spoiler, the resilient rails and the terminal caps can be reused results in considerably lower costs for the consumer than when an entire wiper blade must be replaced. Moreover, less waste is incurred, which is more environmentally friendly.

In order to facilitate disassembly and to make it easier to grasp the cover in the process, especially, e.g., when the cover is hard to swivel because of deposed dirt or other environmental influences, said cover has several gripping grooves. In addition, the flexible tongue has a disassembly wedge arranged in the center on its side facing the top strip, and the shape of said wedge supports the lifting of the flexible tongue when the terminal cap is pulled off.

The base part and the cover are comprised preferably of plastic and are manufactured in large unit numbers cost-effectively in an injection molding process. In addition to various locking means that are formed, the injection-molded cover has an open hub on the front side. The base part also possesses the final, external shape after injection molding and features, in the opening, the flexible tongue with the locking mandrel as well as an axis to accommodate the cover. This axis is flattened and namely in such a way that the open hub 1 can be mounted only in the opened position of the cover and is locked when swiveling into the closed position.

In another embodiment of the invention, the locking mandrel that engages in the top strip is formed on a cylindrical stopper. After connecting the base part to the wiper blade end, said stopper is screwed into a receptacle opening of the base part. To do so, the stopper has a quick thread on its circumference, which is formed expediently by groove-shaped recesses.

Counterparts, e.g., pins, arranged on the wall of the receptacle opening engage in these grooves. The stopper has a slot on its front side so that it can be screwed in by means of a screw driver. In an assembled state, the locking mandrel engages with its tip in the top strip and at the same time is adjacent with the lateral surface to the side of the bridge that faces away from the end of the wiper blade, thereby also fixing the wiper strip, the resilient rails and the terminal cap in this embodiment. In order to prevent the stopper from detaching unintentionally, said stopper is mounted with a slight initial stress. To do so, the groove-shaped recesses of the quick thread are arranged in a jacket, which surrounds the locking mandrel at a distance and has a longitudinal slot. When inserting the stopper into the receptacle opening and threading the pins into the groove-shaped recesses, the jacket is pressed together slightly on the circumference and is adjacent with an initial stress to their inner surface.

BRIEF DESCRIPTION OF THE DRAWINGS

Additional advantages are yielded from the following description of the drawings. Exemplary embodiments of the invention are depicted in the drawings. The drawings, the description and the claims contain numerous features in combination. The person skilled in the art will also observe individual features expediently and combine them into additional, meaningful combinations.

The drawings show:

FIGS. 11 through 16 Another variation of a terminal cap according to FIGS. 1 through 5.

DETAILED DESCRIPTION

Figure 1:
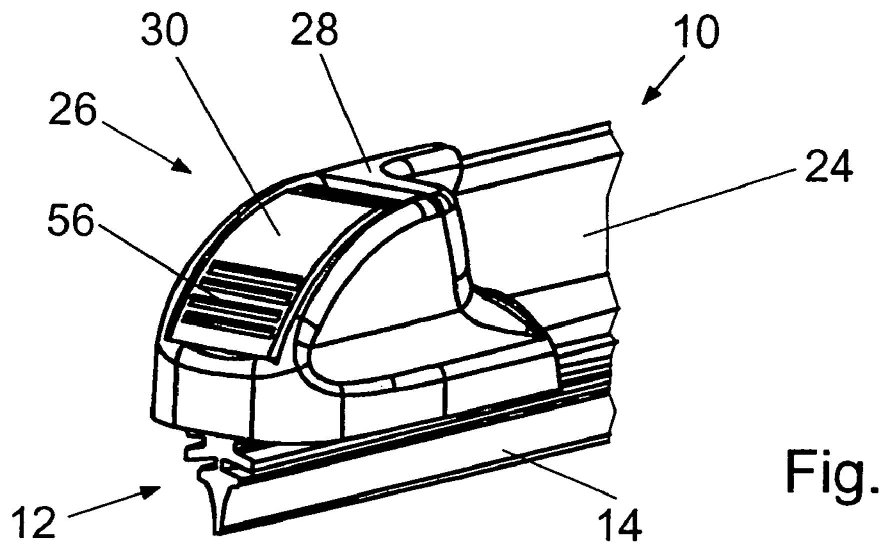
FIG. 1 A perspective partial view of a wiper blade end.
Figure 2:
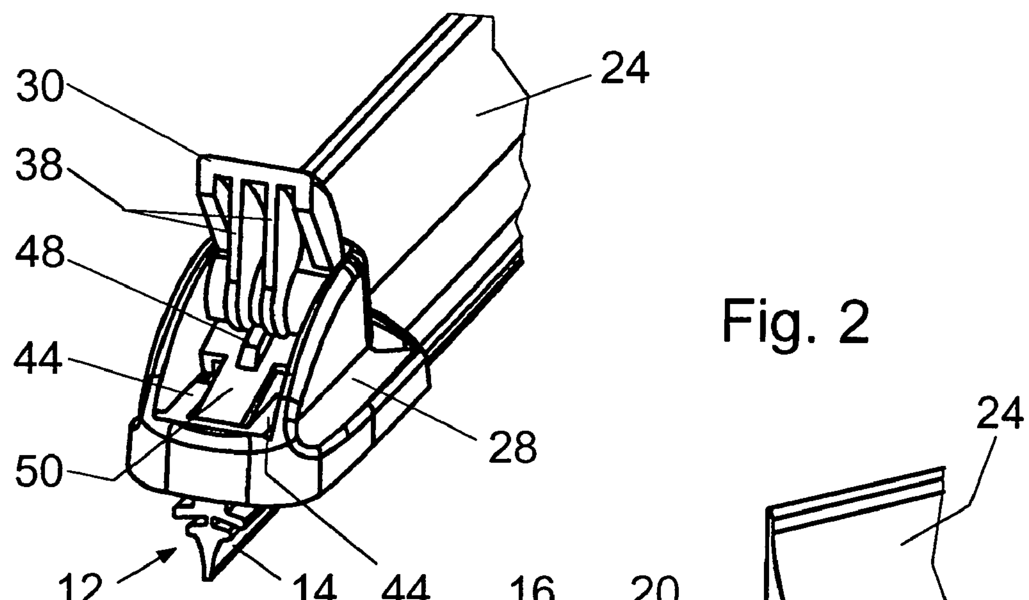
FIG. 2 A wiper blade end according to FIG. 1 with an opened terminal cap.

Only the parts of a non-articulated wiper blade 10 of a windshield wiper that are required to understand the invention are depicted (FIG. 1). The wiper blade 10 has a wiper strip 12 made of an elastomer material, whose lower side facing a windshield (not shown) is embodied as a wiper lip 14. In addition, the wiper blade 10 has a spoiler 24 above the wiper strip 12. Placed on the ends of the wiper blade 10 are terminal caps 26, whose guide surfaces run in the longitudinal direction of the wiper blade 10 and are adjacent with a slight shoulder to the guide surface of the spoiler 24 so that in this state the wiper blade 10 has an aerodynamically favorable shape.

Figure 3:
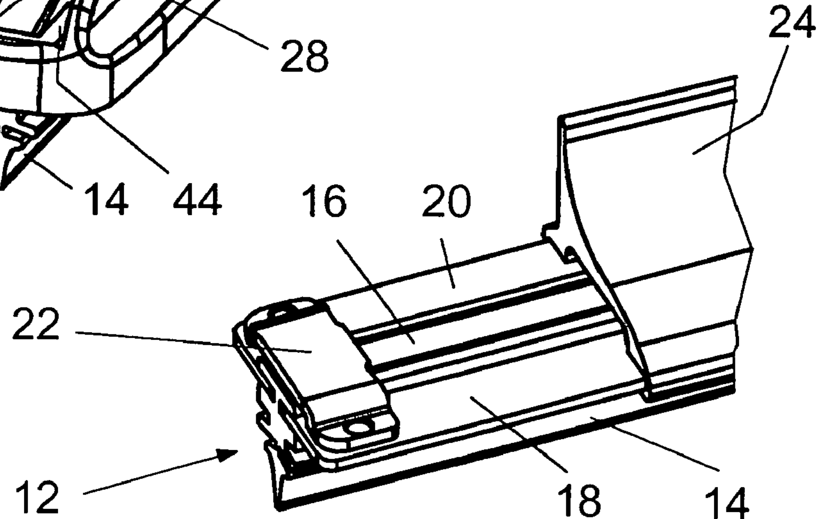
FIG. 3 A wiper blade end according to FIG. 1 without a terminal cap.

The terminal cap 26 is embodied to be two-part and is comprised in a first embodiment of a base part 28 and a cover 30, which assumes a closed position in the assembled state (FIG. 1). With an opened cover 30, the base part 28 can be removed from the end of the wiper strip 12 in order to replace the worn wiper strip 12 when there is poor wiper quality (FIG. 3). Gripping groves 56 are provided on the outer side of the cover 30 for easier assembly. As a support element, the wiper strip 12 has two resilient rails 18 and 20 made of spring steel, which are arranged in longitudinal grooves between the wiper lip 14 and the top strip 16. In a central area, the spoiler 24 encircles the resilient rails 18 and 20, while said resilient rails are held together on the ends by a bridge 22, which is fastened on its lateral parts to the resilient rails 18, 20. During replacement, the worn wiper strip 12 is pulled out of the resilient rails 18, 20 and replaced with a new one.

Figure 5:
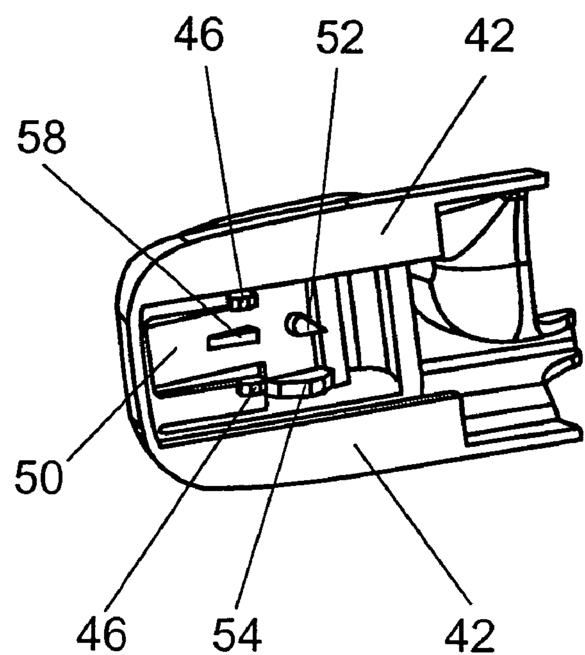
FIG. 5 A perspective representation of a good terminal cap from below.

Afterwards the base part 28 with an opened cover 30 is connected on the end of the wiper strip 12 until the locking hooks 44 lock with their locking noses 46 on the side of the bridge 22 that faces away from the end of the wiper blade 10. Now the base part 28 is fixed in the longitudinal direction on the end of resilient rails 18, 20. The base part 28 has a guide profile 42 on its under side for simpler threading and as a support on the resilient rails 18 and 20 (FIG. 5). In a second assembly step, the cover 30 is swiveled into its closed position. The cover 30 has two ribs 38 on its inner side, which develop into cams 40 in an end area and thus act on a flexible tongue 50 of the base part 28 with increasing pressure during the swivel motion. In order to make symmetrical pressure on the flexible tongue 50 possible and thereby exclude distortion, there is an axial intermediate space between the ribs 38 in which a guide ridge 48 that is formed on the flexible tongue 50 engages.

On the side facing the top strip 16, the flexible tongue 50 has a locking mandrel 52, whose tip is pressed into the elastic surface of the top strip 16 when the cover 30 is closed so that said top strip is fixed relative to the resilient rails 18 and 20 via the terminal cap 26. In addition, two cheeks 54 that are formed laterally on the flexible tongue 50 lock the locking hooks 44. They support the locking mandrel 52 and cannot detach when the cover 30 is closed. In the center between the locking noses 46 and in the area of the side of the bridge 22 facing away from the end of the wiper blade 10, a disassembly wedge 58 is arranged on the flexible tongue 50. Since the height of the disassembly wedge 58 diminishes towards the end of the wiper blade 10, it supports the lifting of the flexible tongue 50 when the base part 28 is pulled from the end of the wiper blade 10.

Figure 4:
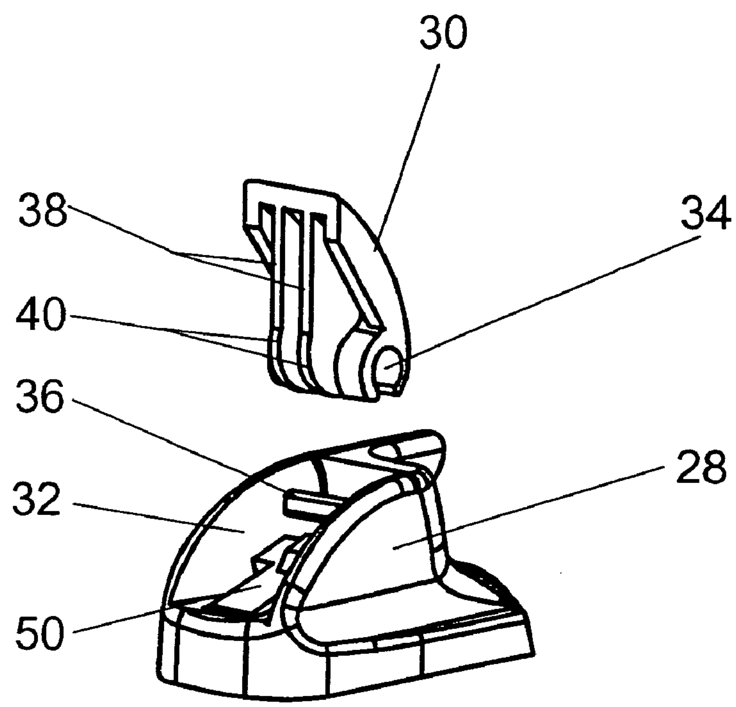
FIG. 4 An exploded representation of a terminal cap.

The base part 28 and the cover 30 are comprised preferably of plastic. They are manufactured as single components in an injection molding process and are then mounted to the terminal cap 26 (FIG. 4). For this purpose, the cover 30 has an open hub 34 on the front side, which is connected on an axis 36 of the base part 28. The axis 36 is arranged in an opening 32 above the flexible tongue 50 and forms the rotational axis for the swivel motion of the cover 30. The axis 36 is flattened expediently so that the open hub 34 can only be mounted in a position that corresponds to the opened cover 30 and is locked in the closed position.

Figure 6:
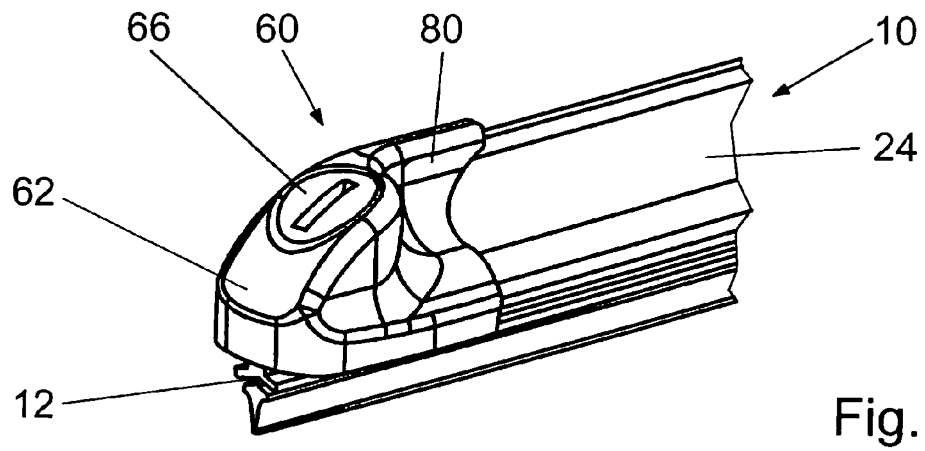
FIGS. 6 through 10 A variation of a terminal cap according to FIGS. 1 through 5.
Figure 7:
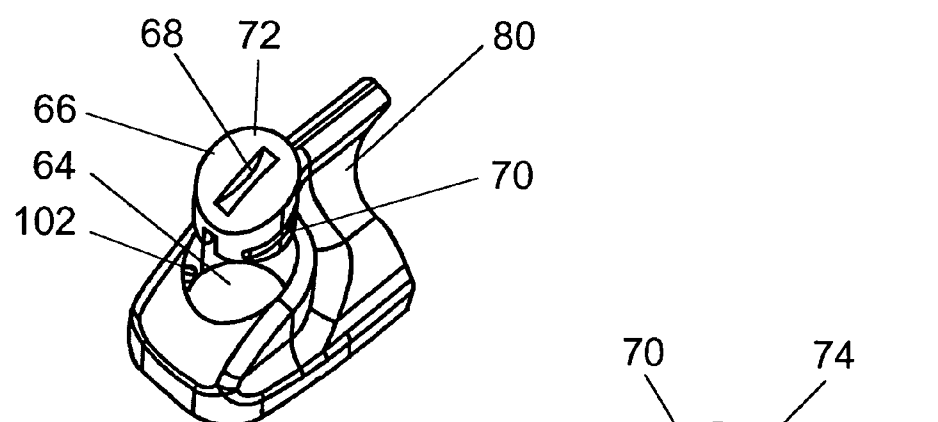
Figure 8:
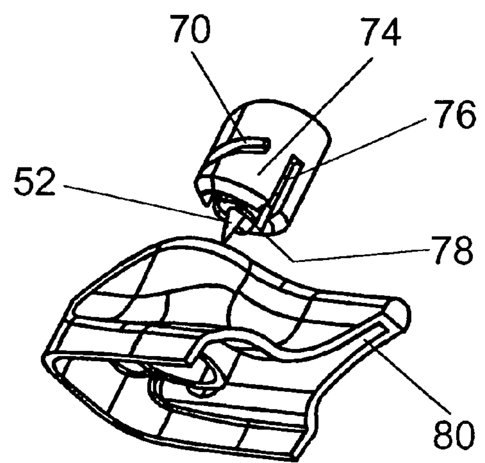

The embodiment according to FIGS. 6 through 10 has a terminal cap 60, which comprised of a base part 62 with a screwed-in stopper 66 (FIG. 6). In an assembled state, the terminal cap 60 covers the end of the wiper blade 10 and is adjacent to the spoiler 24 with a connecting profile 80 in a harmonically and aerodynamically favorable manner. The screwed-in stopper 66 is situated in the closed position. It has a quick thread 70 (FIG. 7) on the circumference, which is formed by groove-shaped recesses, in which two pins 102 arranged on the wall of a receptacle opening 64 engage. A slot 68 on an outer front side 72 of the stopper 66 is used for loosening by means of screw driver. The groove-shaped recesses of the quick thread 70 are provided in a jacket 74, which surrounds a central core 78 at a distance and has a longitudinal slot 76 (FIG. 7). The jacket 74 is pressed together slightly to connect the stopper 66 in the receptacle opening 64 and to thread the pin 102 into the groove-shaped recesses 70 on the circumference.

Figure 9:
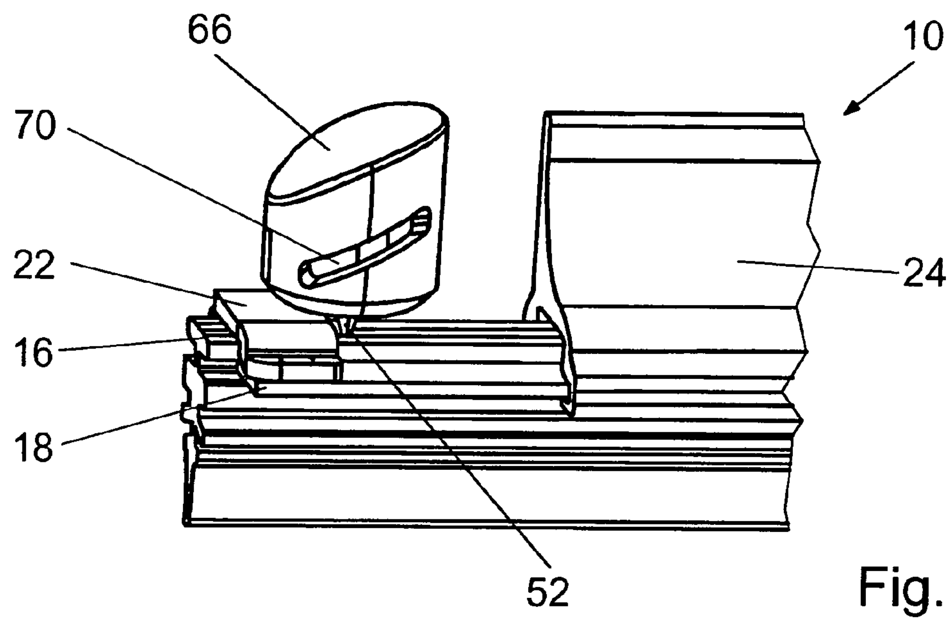
Figure 10:
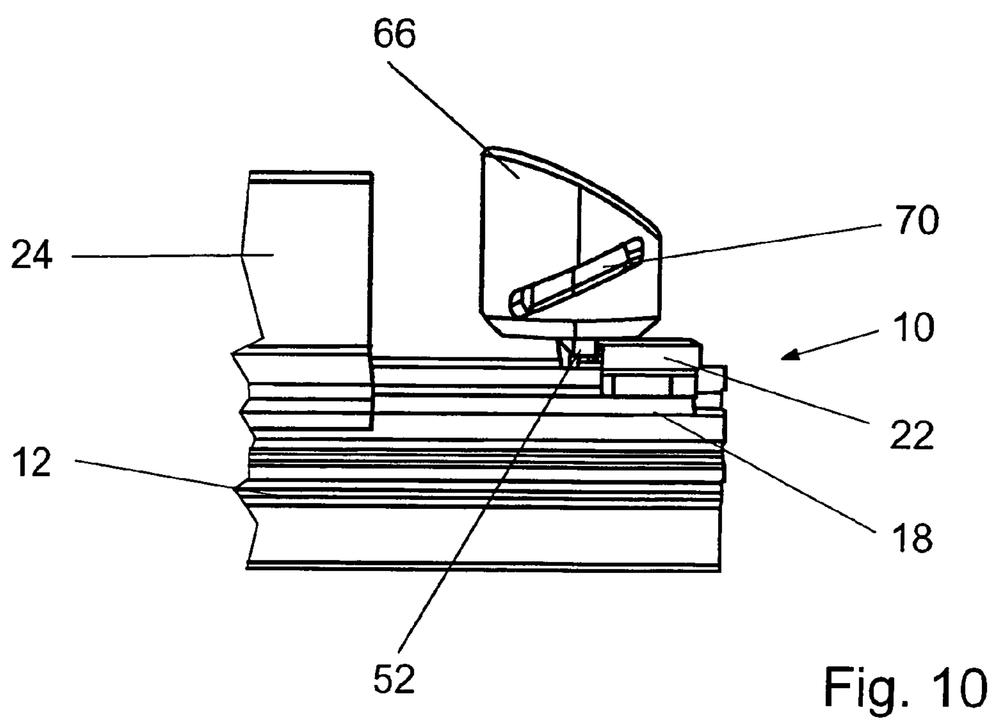

The core 78 of the stopper has a locking mandrel 52, which is arranged on the front side facing the top strip 16, for fixing the top strip 16 relative to the terminal cap 60. In an assembled state, when the base part 82 is adjacent to the spoiler 24 with the front side of the connecting profile 80 and the stopper 66 is screwed into the receptacle opening 64, the tip of the locking mandrel 52 engages in the top strip 16 (FIG. 9). In addition, the lateral surface of the locking mandrel 52 is adjacent to the bridge 22 and fixes the terminal cap 60 on the end of the wiper strip 14 relative to said wiper strip and the resilient rails 18, 20 (FIG. 10).

Figure 15:
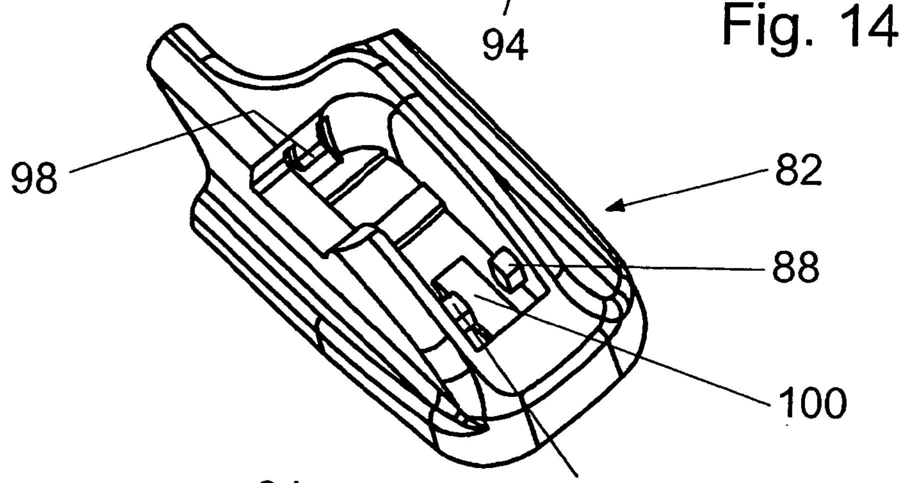

A terminal cap 81 featuring a base part 82 and a cover 84 represents another variation of terminal cap 26 (FIG. 11). The cover 84 is swiveled approx. 45° from the base part 82 to loosen the terminal cap 81 (FIG. 12). In the process, a locking projection 98 (FIG. 15) disengages from a locking indentation 96 (FIG. 12) and detaches the lock of the cover 84. Moreover, the locking mandrel 52 disengages so that the wiper strip 12 is no longer fixed and can be replaced after removing the terminal cap 81.

Figure 14:
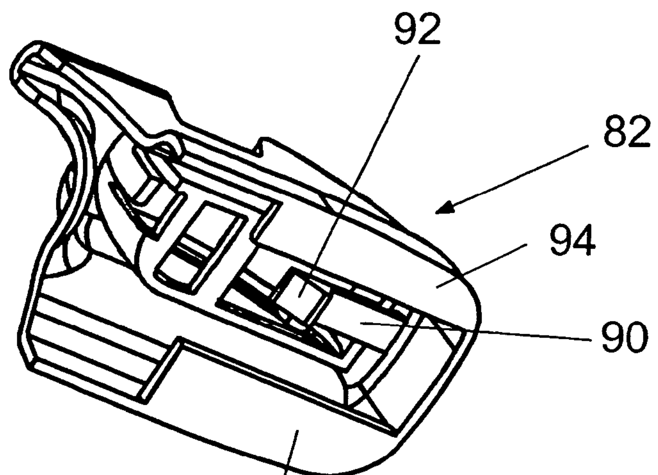
Figure 16:
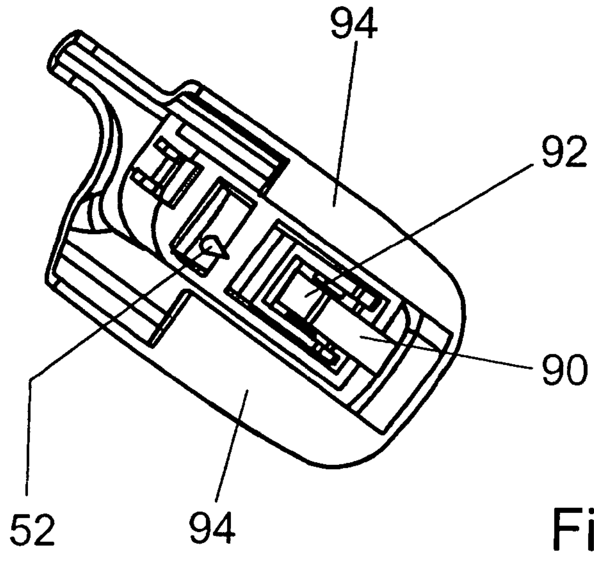

For reassembly, first the base part 82, guided by the guide profile 94, is connected to the end of the wiper blade 10 until a locking hook 90 locks with a locking nose 92 (FIG. 16) behind the bridge 22 of the resilient rails 18 and 20 (FIG. 14). In a second assembly step, the cover 84 is closed, whereby its inner side presses via a bearing surface 100 on the locking hook 90 with the locking nose 92 and locks the locking hook 90. The terminal cap 81 is now fixed on the end of the wiper strip 12, on the one hand, relative to said wiper strip by the locking mandrel 52, whose tip engages in the elastic surface of the top strip 16, and on the other hand, by the locking hook 90 relative to the resilient rails 18, 20.

The base part 82 and the cover 84 are swivel-mounted to one another. For this purpose, the base part 82 features as a rotational axis two flattened bearing pins 88 arranged laterally to the bearing surface 100 so that the open hub 86 can be mounted only in an opened position of the cover 84 and is locked in the closed position of the cover 84.

The invention claimed is:

1. Wiper blade (10) comprising an elastomeric wiper strip (12) having lateral longitudinal grooves into which resilient rails (18, 20) are inserted as support elements, wherein the resilient rails (18, 20) have ends held together and fixed relative to the wiper strip (12) in the longitudinal direction and supporting a terminal cap (26, 60, 81), characterized in that the terminal cap (26, 60, 81) has mounted thereon fixing means that detachably engage in a top strip (16) of the wiper strip (12), wherein the axial movability of the resilient rails (18, 20) relative to the wiper strip (12) is limited by the terminal cap, wherein the terminal cap has a base part and a member movably coupled to the base part, and wherein the member is moveable with respect to the base part between a first position engaging the fixing means in the top strip and a second position disengaging the fixing means in the top strip of the wiper strip.

2. Wiper blade (10) according to claim 1, characterized in that the member is a cover or a stopper and characterized in that the base part (28, 62, 82) of the terminal cap (26, 60, 81) has an opening (32, 64) towards the end of the wiper blade (10), which is closed by the cover (30, 84) or the stopper (66), when the cover (30, 84) or the stopper (66) is in the first position, and is open when the cover (30, 84) or the stopper (66) is in the second position, wherein when moving the cover (30, 84) or the stopper (66) into the first position by closing the cover (30, 84) or inserting the stopper (66), a locking mandrel (52), which defines the fixing means, is pressed into the top strip (16).

3. Wiper blade (10) according to claim 2, characterized in that when the member is a cover the locking mandrel (52) is arranged on an under side of a flexible tongue (50), which when closing the cover (30) is pressed against the top strip (16).

4. Wiper blade (10) according to claim 3, characterized in that the cover (30) is pivoted on an axis (36) and has at least one cam (40) on its inner side, which during the closing motion of the cover (30) presses on the flexible tongue (50).

5. Wiper blade (10) according to claim 4, characterized in that two cams (40) are arranged at an axial distance from one another on the cover, between which a joining ridge (48) is guided, which ridge is tightly connected to the flexible tongue (50) on the side of said tongue that faces the cam (40).

6. Wiper blade (10) according to claim 4, characterized in that the cover (30, 84) has an open hub (34, 86), which cooperates with a flattened axle (36) or with a flattened bearing pin (88) such that the hub (34, 86) can be mounted in the second position and is locked in the first position.

7. Wiper blade (10) according to claim 2, characterized in that the stopper (66) has a quick thread (70) on its circumference, in which a counter part (102) provided on a wall of the opening (64) engages.

8. Wiper blade (10) according to claim 7, characterized in that the stopper (66) has a core (78), on which the locking mandrel (52) is arranged and which is surrounded at a distance by a jacket (74), which has a longitudinal slot (76) and in which the quick thread (70) is provided.

9. Wiper blade (10) according to claim 7, characterized in that the quick thread (70) is formed by a groove-shaped recess in which the counter part, defined as a pin (102) engages.

10. Wiper blade (10) according to claim 7, characterized in that the opening (64) is arranged such that the locking mandrel (52) of the stopper (66) in an assembly position of the terminal cap (81) is adjacent to a side of a bridge (22), which faces away from an end of the wiper blade (10) and the bridge (22) is tightly connected to the resilient rails (18, 20) at lateral parts of said bridge.

11. Wiper blade (10) according to claim 3, characterized in that the flexible tongue (50) has a disassembly wedge (58) on a side facing the top strip (16), which wedge diminishes in terms of its height towards the end of the wiper blade (10).

12. Wiper blade (10) according to claim 1, characterized in that the base part (28, 82) has at least one locking hook (44, 90), which locks with a locking nose (46, 92) on a side of a bridge (22) that faces away from an end of the wiper blade (10).

13. Wiper blade (10) according to claim 12, characterized in that the locking hook (44, 90) is locked in the first, locked position by the member cover (30, 84).

14. Wiper blade (10) according to claim 12, characterized in that a locking mandrel (52) is arranged on an under side of the member cover (84).

15. Wiper blade (10) according to claim 12, characterized in that the member cover (30, 84) can be locked with the base part (28, 82) on an end facing away from an open hub (34, 86).

16. Wiper blade according to claim 1, wherein the resilient rails are held together by a bridge, the bridge being separate from the terminal cap.

17. Wiper blade according to claim 16, wherein the terminal cap is connected to the wiper strip by a locking hook that engages the bridge when the terminal cap slides onto the wiper strip.

18. Wiper blade according to claim 1, wherein the member is a cover movably coupled to the base part.

19. Wiper blade according to claim 18, wherein the fixing means comprise a locking mandrel mounted on the cover for movement therewith, the locking mandrel engaging the top strip when the cover is closed in the first position.

20. Wiper blade according to claim 19, wherein the resilient rails are held together by a bridge separate from the terminal cap, wherein the terminal cap is connected to the wiper strip by a locking hook that engages the bridge when the terminal cap slides onto the wiper strip, and wherein the cover presses on the locking hook and locks the locking hook when the cover is in the closed position.

21. Wiper blade according to claim 1, wherein the member is a stopper moveably coupled to the base part.

* * * * *